United States Patent
Yang et al.

(10) Patent No.: US 6,198,936 B1
(45) Date of Patent: Mar. 6, 2001

(54) METHOD FOR TRANSMITTING AND RECEIVING CONTROL PLANE INFORMATION USING MEDIUM ACCESS CONTROL FRAME STRUCTURE FOR TRANSMITTING USER INFORMATION THROUGH AN ASSOCIATED CONTROL CHANNEL

(75) Inventors: Soon Sung Yang; Pyung Jung Song; Kyoung Joon Lee; Hun Lee, all of Daejon-Shi (KR)

(73) Assignee: Electronics and Telecommunications Research Institute, Daejon-shi (KR)

( * ) Notice: Subject to any disclaimer, the term of this patent is extended or adjusted under 35 U.S.C. 154(b) by 0 days.

(21) Appl. No.: 09/143,218

(22) Filed: Aug. 28, 1998

(30) Foreign Application Priority Data

Oct. 13, 1997 (KR) .................................. 97-52233

(51) Int. Cl.[7] ...................................................... H04B 7/00
(52) U.S. Cl. .......................... 455/515; 455/434; 370/469; 370/347
(58) Field of Search ...................................... 455/511, 434, 455/515, 466, 517, 524; 370/469, 347, 350

(56) References Cited

U.S. PATENT DOCUMENTS

| | | | |
|---|---|---|---|
| 5,239,678 | * | 8/1993 | Grube et al. ........................ 455/511 |
| 5,280,476 | * | 1/1994 | Kofima et al. ..................... 370/60.1 |
| 5,559,804 | * | 9/1996 | Amada et al. ..................... 370/95.3 |
| 5,799,251 | * | 8/1998 | Paavonen ............................ 455/511 |
| 5,802,065 | * | 9/1998 | Ogawa et al. ...................... 370/469 |
| 5,886,989 | * | 3/1999 | Evans et al. ........................ 370/347 |

OTHER PUBLICATIONS

Performace and Quality of Service (QoS) Requirements for International Mobile Telecommunication–2000(IMT 2000), Jun. 1999.*

* cited by examiner

Primary Examiner—Edward F. Urban
Assistant Examiner—Tilahun Gesesse
(74) Attorney, Agent, or Firm—Cohen, Pontani, Lieberman & Pavane

(57) ABSTRACT

The present invention relates to a method for transmitting and receiving informations of control plane using MAC frame structure in order to transmit user data through associated control channel so that the radio resource formed between a mobile station and a base station can be used efficiently, in the case that the third generation mobile communication system which needs large scale control information necessarily uses out-of-band signal method for providing various services. The method for transmitting and receiving information between mobile station and base station of mobile communication system using an associated channel comprise the steps of receiving information from user plane and control plane, constructing a frame, and transmitting the frame which is pointed out by the plane determined by the corresponding information after analyzing the information (step 1); and analyzing the frame after receiving the information through the associated channel and receiving the information using the plane corresponding to the frame (step 2).

3 Claims, 5 Drawing Sheets

METHOD FOR TRANSMITTING AND RECEIVING CONTROL PLANE INFORMATION USING MEDIUM ACCESS CONTROL FRAME STRUCTURE FOR TRANSMITTING USER INFORMATION THROUGH AN ASSOCIATED CONTROL CHANNEL

BACKGROUND OF THE INVENTION

1. Field of the Invention

The present invention relates to a method for transmitting and receiving informations of control plane using MAC (medium access control) frame structure in order to transmit user data through an associated control channel so that the radio resource formed between a mobile station and a base station can be used efficiently, in the case that the third generation mobile communication system which needs large scale control information necessarily uses out-of-band signal method for providing various services.

2. Description of the Related Art

As the third generation mobile communication service such as ITM-2000 (International Mobile Telecommunication-2000) provides various services, the quantity of signal transmitted between the mobile station and the base station is increased considerably compared with that of prior mobile communication system, and accordingly it is desirable to set a dedicated control channel in addition to a traffic channel for maintaining the quality of traffic and providing various services. The signal transmission method described above is called out-of-band signal method. The out-of-band signal method is a signal transmission method in which an associated control channel and more than one traffic channel are assigned and other mobile station can not use them after a call is set and until a call is cancelled. Therefore, if the user informations can be transmitted using the channel which is not used frequently after setting a call, the radio resource can be used efficiently and the services can be provided to more users.

The IS-95 Code Division Multiple Access (CDMA) digital mobile communication system is a system for voice communication mainly, so it does not have much signal traffic. Accordingly, when a signal traffic needs to be transmitted, the system adopts the method that the quality of voice traffic is deteriorated to some extent. That is, when the signal needs to be transmitted, the signal was transmitted using the traffic channel only without separating the signal channel from traffic channel. Such signal transmission method is called in-band signal transmission method. However, this method could not satisfy user's service requirements since user requires various and high quality services. The various and high quality services require more signal traffics compared with simple services relatively, and the Quality Of Service (QOS) of user data is deteriorated and delay of signal traffic transmission occurs when signals are to be transmitted in the in-band method. This problem can be solved by transmitting the signal traffics using other channel different from user data transmission channel. This is called out-of-band signal transmission method.

In the signal channel setting method of mobile station and base station, the out-of-band signal transmission method requires more control channels than that of in-band signal transmission method. Also, the informations transmitted through control channel usually occur at the time of call setting and cancelling and have low frequency in use compared with traffic channel. Accordingly, in mobile communication, the control channel having low frequency in use not only causes waste of radio resource but deteriorates capacity and performance of system.

SUMMARY OF THE INVENTION

An object of the invention is to provide a method for transmitting and receiving control plane informations in which a base station use MAC frame structure in order to transmit user data of the mobile station using an associated control channel assigned to the mobile station in order to protect the waste of radio resource caused by the out-of-band signal transmission method.

The method for transmitting and receiving information between mobile station and base station of mobile communication system using an associated channel comprise the steps of transmitting the frame which is pointed out by the plane determined by the corresponding information after receiving information from a user plane and a control plane, constructing a frame, and analyzing the information (step 1); and receiving the information using the plane corresponding to the frame after receiving the information through the associated control channel and analyzing the frame (step 2).

BRIEF DESCRIPTION OF THE DRAWINGS

The above object, and other features and advantages of the present invention will become more apparent by describing the preferred embodiment thereof with reference to the accompanyings, in which.

Similar reference characters refer to similar parts in the several views of the drawings.

DESCRIPTION OF THE PREFERRED EMBODIMENT

Figure 1:
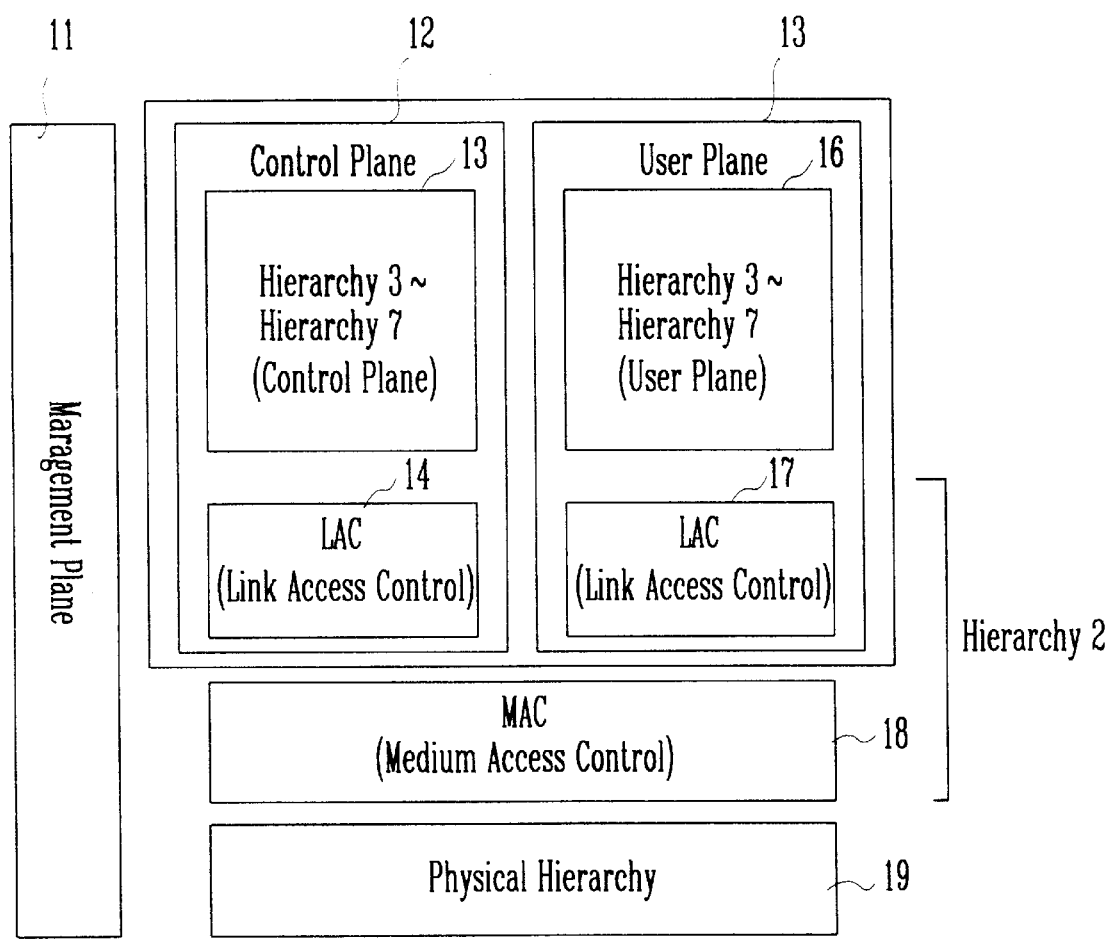
FIG. 1 is a structural diagram showing a protocol stack for radio area of the mobile communication system in accordance with the invention.

FIG. 1 is a structural diagram showing a protocol stack for video area of the mobile communication system in accordance with the invention.

First, protocol stack function of radio area is described as follows.

The protocol stack consists of a control plane 12 which performs function of channel assignment, maintenance and cancel for transmitting the user informations, a user plane which transmits user informations reliably by channel assigned using the protocol of the control plane 12, and a manager plane 11 which performs management function between protocol hierarchies or between planes. The management plane 11 processes the matters occurred in the apparatus and therefore it is not concerned with information transmission to the radio area. The hierarchy 2 consists of logical link access control (LAC) sub-hierarchy 14 and 17 and medium access control sub-hierarchy 18. The LAC sub-hierarchy 14 and 17 provides different functions according to the property of informations to transmit. The non-response transmission method of non-connection type mode is used if the base station wishes to transmit informations to many mobile stations, and response transmission method of non-connection type mode is used if the mobile station requests channel for originating to the base station. If the control channel is assigned, the response transmission method of connection type mode is used. A LAC function of user plane 15 also provides different functions according to the property of informations to transmit. For example, if the voice informations is transmitted through traffic channel, it is desirable not to re-transmit or not to recover error for the property of service which requires real time communication instead of the functions of error detection or error correction. However, when the informations to transmit is a document, it is requested to re-transmit for detecting and correcting the errors instead of real time communication. A MAC sub-hierarchy 18 performs multiplexing and demultiplexing functions between a number of logical channel and physical channel, mapping management function between logical channel and physical channel, segmentation function of the informations into frame unit which is transmitted from the physical channel or reassembly function of the informations.

Figure 2:
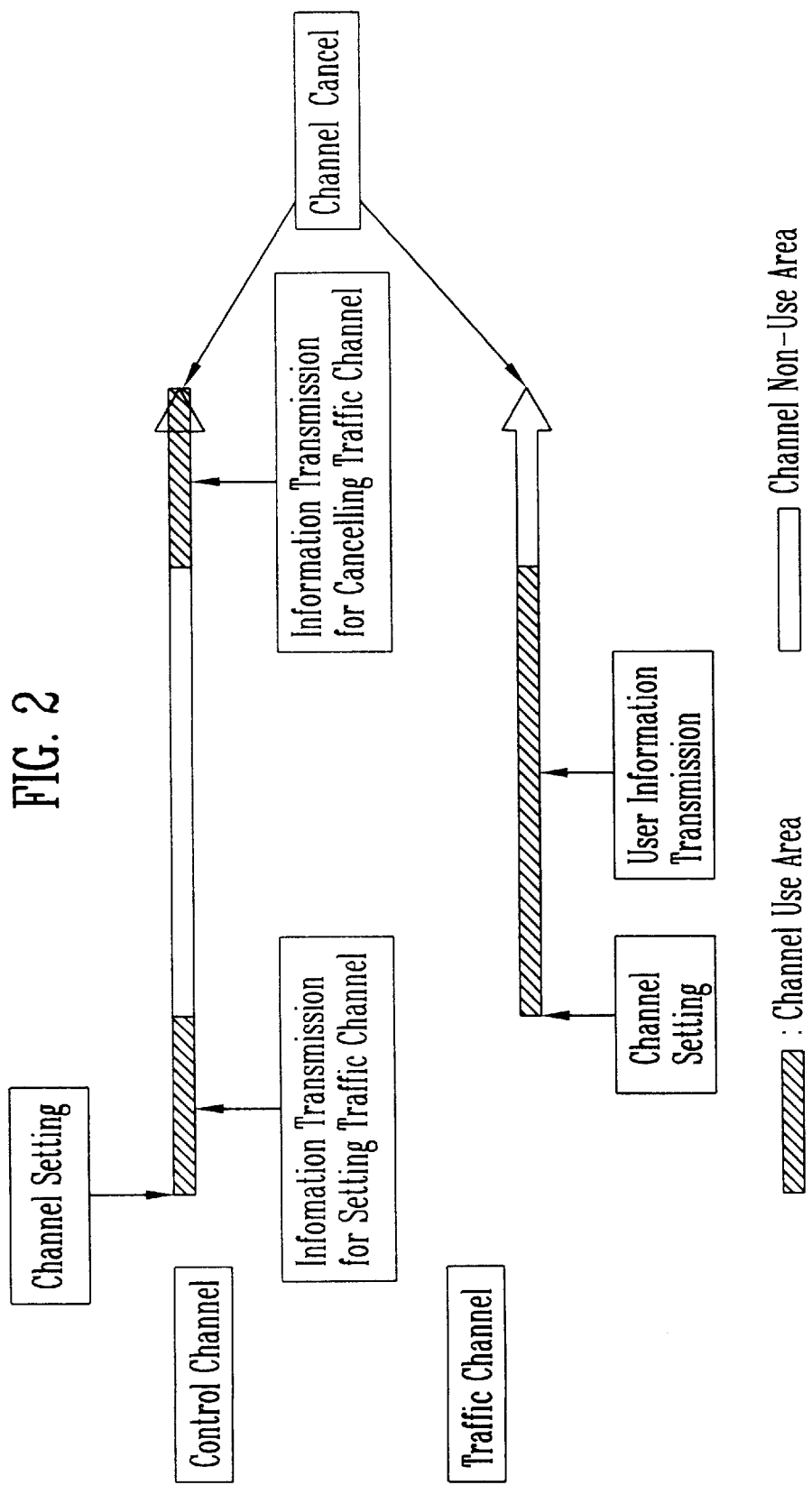
FIG. 2 shows an assignment and cancel timing of logical channel constructed between the mobile station and the base station.

FIG. 2 shows an assignment and cancel timing of logical channel constructed between the mobile station and the base station.

At first, usage time and information transmission of each channel are described as follows.

The mobile communication system using out-of-band signal method assigns associated control channel and traffic channel for communicating between the mobile station and the base station and other mobile station can not use them. In general, an associated control channel is assigned at first, and traffic channel is assigned when the communication entity can be connected by protocol using the associated control channel. After the traffic channel is set, an associated control channel is scarcely used until a protocol for cancelling the traffic channel is performed. If a hand over or procedure changing the property of traffic channel do not occur during the user informations are transmitted and received using traffic channel, an associated control channel is not used until the traffic channel cancellation procedure is performed.

Figure 3:
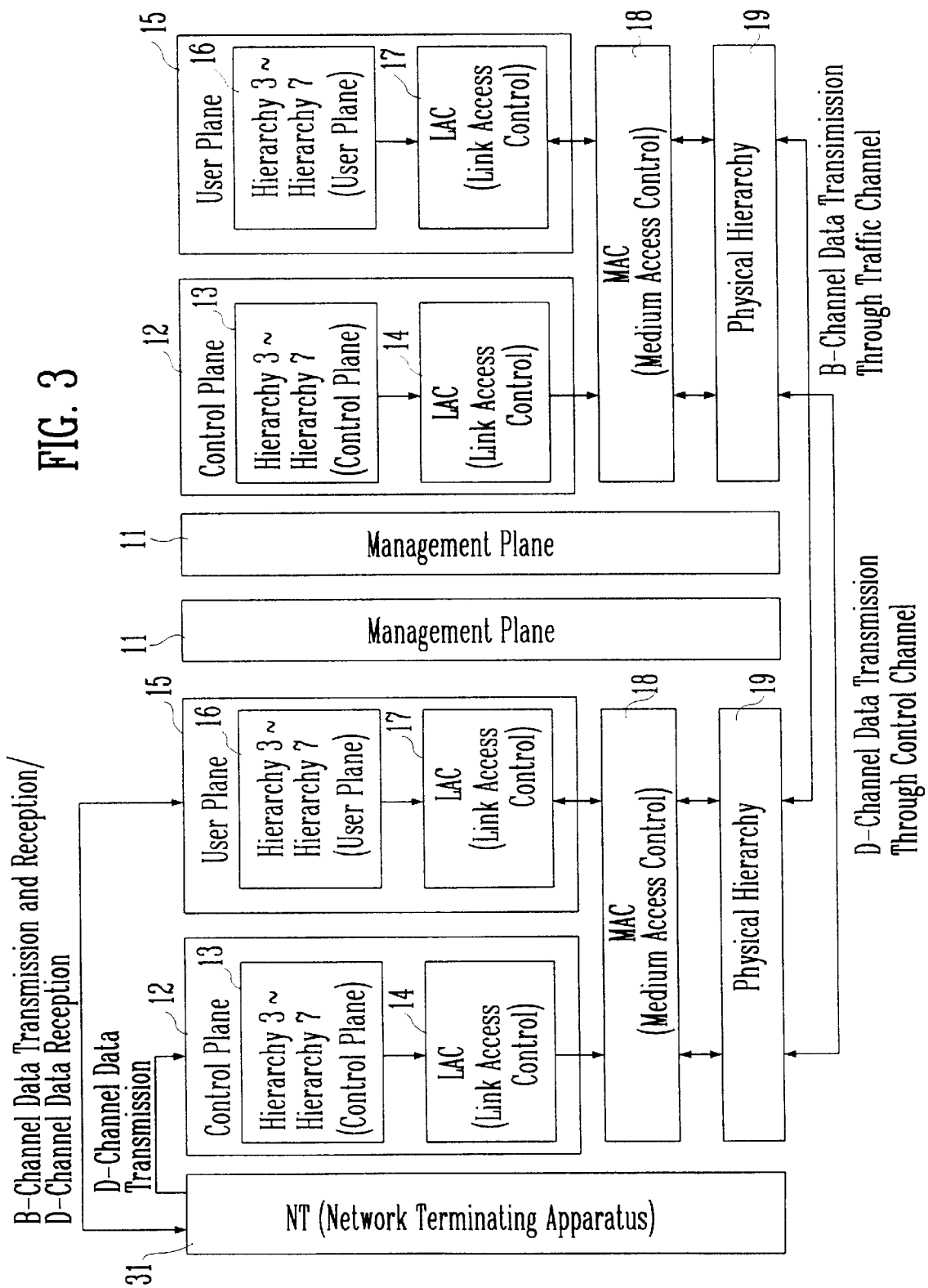
FIG. 3 is a diagram showing transmission of user informations using an associated control channel and a traffic channel.

FIG. 3 is a diagram showing transmission of user informations using an associated control channel and a traffic channel.

The mobile station has a matching apparatus which can communicate peripheral fixed terminals for supporting various user services. The fixed terminal 10 is Data Terminal Equipment (DTE) which is being used or will be used, for example, personal computer, a terminal for Integrated Service Digital Network.

If there is a service which requires 144 kbps (2B+D) transmission capacity using a terminal for ISDN, an associated control channel and a traffic channel between the mobile station and the base station are assigned for supporting the service. If the user information are not transmitted using the associated control channel, much information is transmitted through the traffic channel while no information is transmitted through the associated control channel. Also, in order to transmit all the user information through the traffic channel, more radio resources are used and the interference to other user also increases since the transmission capacity of traffic channel should be 144 kbps.

The procedure for transmitting user information using associated control channel is described as follows.

The protocol of control plane and user plane of mobile station has a function of transmitting and receiving them after separating a control information (ISDN D-channel information) from user information (ISDN B-channel information) in network terminating apparatus in order to support services using ISDN fixed terminal. The protocol stack of control plane 12 is used in order to transmit and receive the associated control information through the associated control channel of mobile station, and the protocol stack of user plane 15 is used in order to transmit the user information. A special primitive for identifying the transmission request of user control information should be defined since the protocol stack of control plane 12 has to process both function of controlling call and function of transmitting user control information simultaneously. The MAC sub-hierarchy 18 of transmission stage receives a control information and general information through LAC sub-hierarchy 14. The MAC sub-hierarchy 18 which received information to primitive defined in advance in order to transmit user control information transmits user control information using the associated control channel. The information is transmitted through the traffic channel when the MAC sub-hierarchy 18 receives user general information from user plane. The MAC sub-hierarchy 18 of receiver stage is able to receive user general information through the traffic channel and receive both user control information and user general information through the associated control channel. Since both call control information and user control information can be received through the associated control channel, a pointer is needed which can separate the path in order to operate suitable communication entity according to received information. If the pointer which provides that function is defined, it is possible to use transmission capacity of the associated channel which was idle for a long time during communication.

Figure 4:
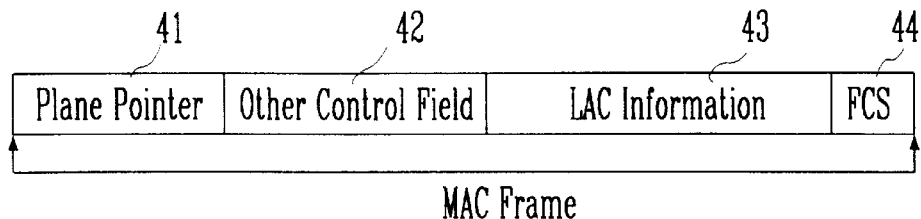
FIG. 4 shows a frame structural diagram of an MAC sub-hierarchy for sectioning user control informations and call control information which are transmitted and received using control channel in accordance with the invention.

FIG. 4 shows a frame structural diagram of MAC sub-hierarchy for sectioning user control informations and call control information which are transmitted and received using control channel in accordance with the invention.

The MAC sub-hierarchy of transmission stage can determine whether the information requested to transmit by primitive on receiving information from LAC sub-hierarchy of the control plane is call control information or user information. When MAC frame is constructed according to the result of determination, the plane pointer 41 is added and the frame check sequence (FCS) 44 for that is constructed. The MAC frame constructed like that can be transmitted using associated control channel. If only plane pointer 41 is defined for control information for MAC frame, FCS may be useless. The MAC sub-hierarchy of receiver stage can receive MAC frame including user control information and call control information for associated control channel. MAC sub-hierarchy transmits information to protocol stack of user plane or protocol stack of control plane in accordance with plane pointer 41 information of MAC frame received.

The method of the invention is characterized in that a plane pointer 41 is defined on MAC frame in order that the base station can transmit and receive user information and call control information simultaneously through the dedicated control channel assigned to the mobile station. The plane pointer 41 is used to separate control information and user information.

Figure 5A:
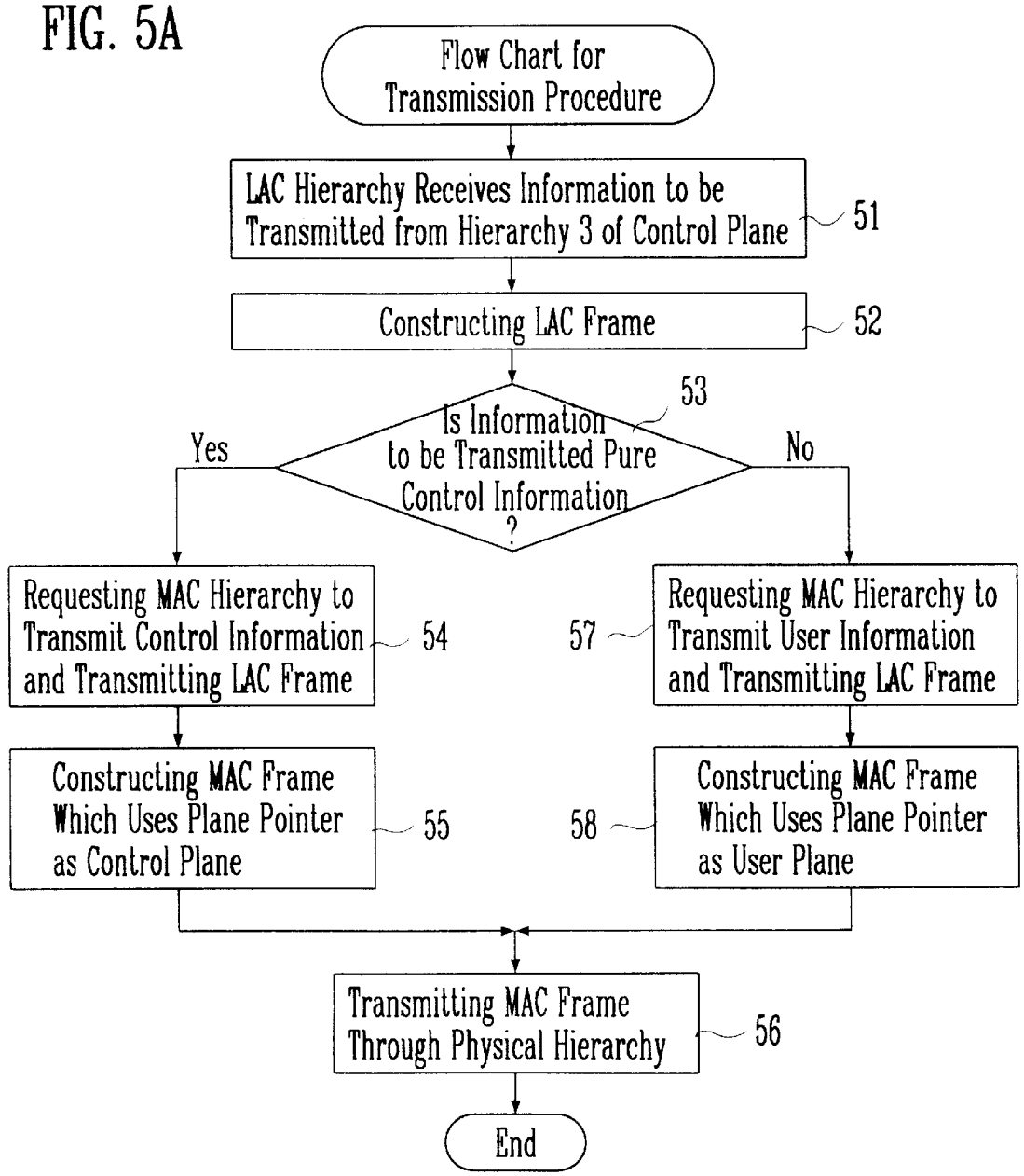
FIGS. 5a and 5b is a flow chart showing transmission and reception of control plane informations using an MAC frame structure in accordance with the invention.
Figure 5B:
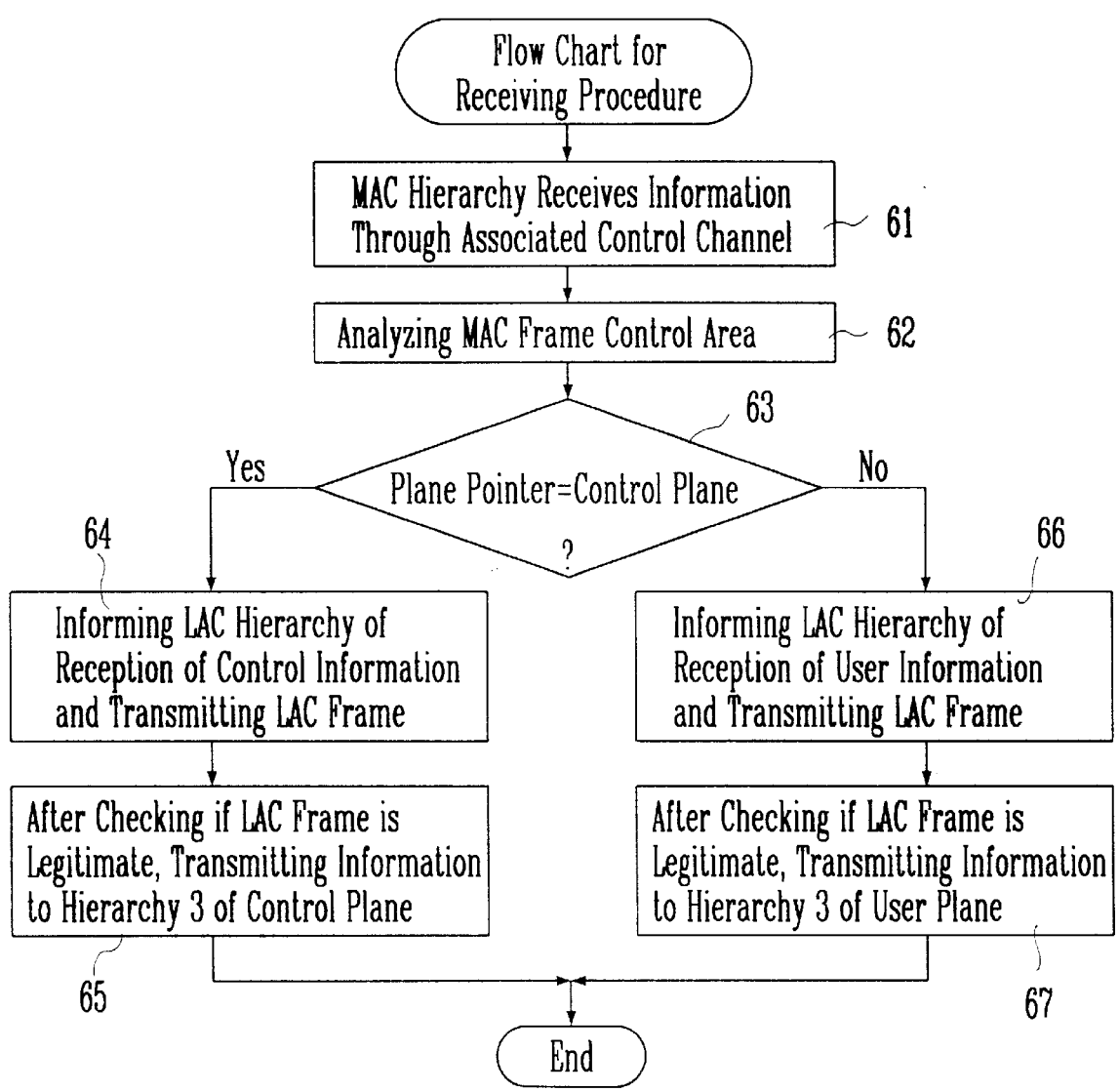

FIGS. 5a and 5b is a flow chart showing transmission and reception of control plane informations using MAC frame structure in accordance with the invention.

First, in the case of transmission, LAC frame is constructed (step 52) after LAC hierarchy received information to be transmitted from the hierarchy 3 of control plane (step 51).

Also, after determining if the information to be transmitted is pure control information (step 53), if so, the LAC frame is transmitted by requesting transmission of control information to MAC hierarchy (step 54), and the MAC frame is transmitted through physical hierarchy (step 56) by constructing MAC frame in which plane pointer is control plane (step 55).

Otherwise, after determining if the information to be transmitted is pure control information (step 53), if not, the LAC frame is transmitted by requesting transmission of user information to MAC hierarchy (step 57), and the MAC frame is transmitted through physical hierarchy (step 56) by constructing MAC frame in which plane pointer is user plane (step 58).

In the case of reception, the control area of MAC frame is analyzed (step 62) after MAC hierarchy received information on the associated control channel (step 61).

Also, after determining if the plane pointer is control pointer (step 63), if so, the reception of control information is informed to LAC hierarchy and LAC frame is transmitted to it (step 64), and the information is transmitted to hierarchy 3 of control plane after checking if LAC frame is legitimate (step 65).

Otherwise, after determining if the plane pointer is control pointer (step 63), if not, the reception of user information is informed to LAC hierarchy and LAC frame is transmitted to it (step 66), and the hierarchy 3 of user plane receives information after checking if LAC frame is legitimate (step 67).

Having described preferred embodiment of the invention with reference to the accompanying drawings, it is to be understood that the present invention is not limited to the above-mentioned embodiment and that various changes and modifications can be effected therein by one skilled in the art without departing from the spirit or scope of the present invention as defined in the appended claims.

The invention can use transmission capacity of associated control channel as well as the traffic channel by transmitting user informations using the associated control channel which is idle situation for a long time during the transmission and reception of informations is performed continuously through active traffic channel in the radio service area, use the radio resource effectively compared with the traffic channel which requires high speed transmission capacity relatively since the transmission capacity of the traffic channel can be reduced additionally by using transmission capacity of idle associated control channel, and extend service provision ability of system since the interferences between mobile stations can be minimized.

While the present invention has been described and illustrated herein with reference to the preferred embodiment thereof, it will be understood by those skilled in the art that various changes in form and details may be made therein without departing from the spirit and scope of the invention.

What is claimed is:

1. A method for transmitting and receiving information between mobile station and a base station of a mobile communication system using an associated control channel, comprising the steps of:

constructing a link access control (LAC) frame after a LAC hierarchy receives information to be transmitted from a hierarchy 3 of a control plane or a user plane, and transmitting the LAC frame to a medium access control (MAC) hierarchy;

constructing a MAC frame defining a plane pointer which indicates either a user information or a call control information and transmitting the MAC frame through a physical hierarchy;

analyzing a control area of the MAC frame after the MAC hierarchy receives information through an associated control channel;

transmitting the LAC frame to the LAC hierarchy after determining whether the plane pointer is indicating the user information or the control information; and receiving information using the hierarchy 3 of the control plane or the user plane after determining legitimacy of the LAC frame.

2. The method according to claim 1, wherein transmitting the LAC frame to a MAC hierarchy comprises the steps of:

transmitting the LAC frame after requesting transmission of the control information to the MAC hierarchy if the information to be transmitted was received from the control plane; and transmitting the LAC frame after requesting transmission of the user information to the MAC hierarchy if the information to be transmitted was received from the user plane.

3. The method according to claim 1, wherein the transmitting the LAC frame to the LAC hierarchy comprises the step of:

informing the LAC hierarchy of reception of the user information and transmitting the LAC frame to it, if the plane pointer is indicating the user information; and informing the LAC hierarchy of reception of the control information and transmitting the LAC frame to it, if the plane pointer is indicating the control information.

* * * * *